United States Patent Office 2,891,999
Patented June 23, 1959

2,891,999

CATALYTIC METAL-MODIFIED RESIN AND ITS USE IN OLEFIN HYDRATION

Arthur W. Langer, Jr., Plainfield, N.J., assignor to Esso Research and Engineering Company, a corporation of Delaware No Drawing. Original application November 15, 1954, Serial No. 469,007. Divided and this application July 18, 1957, Serial No. 672,547

8 Claims. (Cl. 260—614)

This invention relates to the production of alcohols and ethers by the direct hydration of the lower olefins such as ethylene, propylene and n-butylenes. More particularly, it relates to a novel catalyst containing a metal-modified ion exchange resin and to the use of such catalysts in the hydration of the lower olefins.

Recent developments indicate that the inclusion of minor amounts of oxygenated compounds such as the lower alcohols in gasoline may have important advantages, particularly in preventing carburetor icing. The demand for other oxygenated compounds such as ethers has also been increasing rapidly, especially for various solvent purposes. As a result a need has arisen for an efficient process capable of producing large amounts of materials such as isopropyl alcohol and diisopropyl ether. Of course, the production of isopropyl alcohol by forming the ester of the alcohol as an intermediate by reaction of propylene with sulfuric acid is an old and widely practiced process. Nevertheless, it has several serious disadvantages, the more important ones being the corrosiveness of the acid, the frequent need for neutralizing the product, and the necessity of diluting the acid in separating it from the hydrated product and the consequent need for a reconcentration step so as to allow recycling of the acid to the process. Furthermore, preparation of the ether by the sulfuric acid process involves two distinct steps and is basically expensive in terms of initial investment requirements as well as operating costs.

Direct hydration of olefins in the presence of various solid catalysts has also been proposed previously as a means of avoiding the various disadvantages of the sulfuric acid hydration process. Phosphoric acid deposited on silica gel or clay as well as reduced tungsten oxide, are typical examples of such previously used solid catalysts. However, while they avoid some of the handling problems of sulfuric acid, they in turn tend to introduce new complications, notably the production of comparatively large amounts of unwanted polymer and ketone. Furthermore, such prior catalysts have generally required high temperatures in excess of about 500° F. if reasonably satisfactory yields and selectivities were to be obtained. See Brennstoff Che., 34, 330 (1953). Finally, the previously known inorganic-type solid catalysts have been generally characterized by inadequate stability and correspondingly short catalyst life, especially when liquid water was present. Consequently, this required operating the hydration process in vapor phase, necessarily attended by low capacity, high temperatures and generally poor equilibrium conditions.

Patent No. 2,477,380 suggests the hydration of $C_4$ to $C_{12}$ iso-olefins in the presence of certain moderately acidic ion exchange resins such as sulphonated coal. However, this prior process also tends to produce large amounts of unwanted polymer and essentially no ether. To minimize polymer formation, it requires relatively low reaction temperatures and thus is characterized by low reaction rates. Furthermore, it is ineffective for the hydration of normal olefins.

It is the main object of the present invention to devise a high capacity process for preparing ethers and alcohols by direct hydration of olefins, especially normal $C_2$–$C_4$ olefins, employing a stable solid hydration catalyst. A more specific object is to provide an olefin hydration process operated under conditions such that the water of reaction is maintained at least partly in liquid phase without substantial harm to the solid catalyst. Still another object of the invention is to provide a catalyst suited for long-term use in such a hydration process and capable of producing high yields of both alcohol and ether. These and other objects, as well as the nature and scope of the invention, will become more clearly apparent from the following description and appended claims. In reading this description, it should be understood that all ratios and percentages of materials are expressed on a weight basis, unless otherwise indicated.

It has now been discovered that olefins such as ethylene, propylene, butylenes and the like, as well as hydrocarbon mixtures containing such olefins, can be hydrated to the corresponding alcohols and ethers in an unusually effective and advantageous manner with the aid of certain metal-modified acidic ion exchange resins. Preferred catalyst materials of this type include synthetic organic cation-exchange resins which contain both free sulfonic, sulfuric, phosphoric or phosphonic acid groups, as well as acid groups of the aforementioned type in the form of salts of heavy metals. For instance, very effective catalysts can be prepared by incorporating in the ion exchange resin ions of heavy metals of group I of the periodic table such as copper and silver, or group VIII metals such as iron, cobalt and nickel, or group VI metals such as chromium, molybdenum, tungsten and uranium, or group II metals such as calcium, strontium, barium and radium, or other ions such as tin, titanium, manganese, cadmium, beryllium, magnesium, aluminum, lithium, lanthanum, platinum, palladium, vanadyl and so forth.

With some metals such as copper, part or all of the metal may advantageously be present as a free metal deposit rather than an ion form. Such a metal deposit can be obtained by reducing the resin salt with hydrogen or other reducing agent prior to use in the hydration reaction, or the desired reduction of the metal may be obtained in the course of the hydration. With phosphoric acid type resins, acid salts of ferrous iron, copper, manganese, calcium, strontium, barium and magnesium are particularly effective. Activity may be further increased by the addition of a promoter such as boria to these metal acid phosphates.

The resinous materials suitable for the preparation of the novel hydration catalysts can be generically defined as aryl type resins. They include the common thermosetting resins such as the solid condensation products of formaldehyde with phenol; natural resin-like materials such as coal, wood or waste petroleum sludge; as well as suitably cross-linked solid polymers of vinyl aromatic compounds such as styrene or vinyl toluene, or cross-linked copolymers of the vinyl aromatic compounds with other monoethylenically unsaturated compounds such as acrylonitrile or its homologues, acrylamide or its homologues, and methyl acrylate or methacrylate or its higher alkyl homologues. For the purposes of this invention, these resinous materials must further contain strong mineral acid groups attached to the organic skeleton, a portion of these acid groups being in the free acid form and a portion in the form of a salt of one of the aforementioned metals.

For the present purposes the ion exchange materials must have a molecular weight high enough or a sufficiently cross-linked structure to be substantially insoluble in water at temperatures up to about 450° F. when containing as many as two sulfonate groups per benzene ring; but they should be capable of being at least partly swelled by water at the hydration temperature used. They must also have good oxidation resistance, good stability toward heat and physical stress, and good exchange capacity as well as exchange rate.

These resins may be prepared in a variety of ways from a variety of raw materials. For instance, the sulfonation or equivalent acid treatment can be applied either to a monomer such as styrene which is subsequently polymerized into a suitable high molecular weight ion-exchange resin; or, preferably, the organic resin may be formed first and the acid groups introduced by treating the solid resin in suitably subdivided or granulated form.

Examples of resins particularly suitable for purposes of the present invention include solid cross-linked polymers of vinyl aromatic compounds such as styrene or vinyl toluene, or cross-linked copolymers of the vinyl aromatic compounds with other monoethylenically unsaturated compounds such as isobutylene, acrylonitrile or its homologues, acrylamide or its homologues, and methyl acrylate or methacrylate or their higher alkyl homologues. The required degree of cross-linking can be obtained either during the synthesis of the resin or by treatment after synthesis. For instance, in the case of polystyrene-type resins a minor amount in the range of about 4 to 25% of a hydrocarbon containing two non-conjugated ethylenic linkages such as divinylbenzene can be added to the styrene monomer in the polymerization mixture so as to produce a resin with a three-dimensional lattice structure. Then this interpolymerized divinylbenzene forms a cross-link between adjacent polystyrene chains. Alternatively, a minor amount of a conjugated diolefin such as butadiene or isoprene can be added to the polymerization mixture to produce a thermoplastic resin which can be subsequently cross-linked by vulcanization with sulfur or the like. Still other cross-linking agents for linear or slightly cross-linked polymers such as polystyrene resins containing 2 to 4% divinylbenzene include treatment with carbon tetrachloride at 280–400° F., exposure at atmospheric temperature to gamma rays in a gamma ray source such as a cobalt 60 source at dosages of about 5 to 10 or 25 million Roentgen units, and so forth.

The best catalysts for purposes of the present invention can be prepared from resinous copolymers of styrene containing a minor amount of p-divinylbenzene combined therewith, resins containing about 88 to 96% styrene copolymerized with 12 to 4% of divinylbenzene being particularly satisfactory in both catalyst activity and catalyst stability.

However, instead of styrene it is permissible to use other monovinyl aromatic compounds such as p-methyl styrene, p-ethyl styrene, dimethyl styrenes, p-chlorostyrene, dichlorostyrenes, vinyl naphthalene, and so forth. While in general compounds having the vinyl group in para position to the alkyl or halogen substituents are preferred, other isomers are similarly useful also. Likewise, instead of using divinylbenzene as the cross-linking agent, other polyvinyl aryl compounds may be used such as divinyl toluene, divinyl xylene, divinyl ethyl benzene, divinyl chlorobenzene, divinyl ethers, and the like.

The polymerization of the aforementioned ingredients can be carried out by any of the well-known methods, e.g., by simple heating at an elevated temperature such as 100° C. for a suitable length of time, such as 10 days. However, it is preferable to use a catalytic amount of an oxygen-yielding compound such as benzoyl peroxide, ammonium persulfate, potassium persulfate, sodium perchlorate, sodium perborate, ozone, ozonides, etc. The polymerization can be carried out either in homogeneous phase or in emulsion. For instance, satisfactory materials can be prepared according to the procedure described in Patent No. 2,089,444 or 2,500,149. Depending on the technique employed, the polymeric resin can be produced either in the form of nearly spherical hard granules of a proper size for further use, or the polymeric resin can be produced in the form of larger masses which are reduced to the desired particle size by crushing or cutting.

Other cross-linked polystyrene-type materials suitable for the present purposes are the solid copolymers of about 40 to 70% styrene, 20 to 50% isobutylene, and about 4 to 25% divinylbenzene, prepared by the low-temperature polymerization technique described, for instance, in Patent No. 2,274,749. As still another alternative, the divinylbenzene may be replaced by a similar amount of butadiene or isoprene in the aforementioned polymerization formula and the resulting copolymer cross-linked or vulcanized after compounding with sulfur.

In making the aforementioned organic materials into the desired cation-exchange resins, they are sulfonated or phosphonated in a manner otherwise well known so as to introduce on the average about 0.25 to 3, preferably about 0.5 to 2, inorganic acid radicals per benzene nucleus of the polymeric resin. Suitable sulfonation agents include concentrated or fuming sulfuric acid, chlorosulfonic acid, sulfur trioxide in nitrobenzene, etc. An excess of the sulfonating agent is used. Depending on the sulfonation agent used, temperature of sulfonation may be in the range of about −20° to 200° C., preferably −20° to +50° C. in the case of chlorosulfonic acid. Higher temperatures are best with sulfuric acid. The resin is preferably in a relatively coarse particle size such as 20–100 mesh so as to be suitable for direct use in the eventual olefin hydration process. Thus, the subdivided copolymer, e.g., one containing 90 percent of combined styrene and 10 percent of combined divinylbenzene, can be mixed with an excess of chlorosulfonic acid, e.g., about 6 parts acid per part of copolymer, briefly heated at reflux temperature for about 3 minutes and subsequently the mixture is held at room temperature for about 50 hours. Finally, a large excess of water is added to the mixture, and the latter is then filtered, washed and dried. In a typical operation a yield of about 235 percent of sulfonated resin (based on copolymer) is thus obtained. This sulfonated resin contains an average of about 1.77 sulfonic acid groups in each of its aromatic nuclei. At lower temperatures less extensive sulfonation is obtained, e.g., one sulfonate group per aromatic ring. Such a product is more stable in all respects and may, therefore, be preferred in commercial operations.

To minimize physical disintegration of the hard copolymer during sulfonation, the granules may first be swelled in a suitable solvent such as benzene, toluene, xylene, carbon tetrachloride, trichloroethylene, tetrachloroethylene and the like, in a manner substantially as described in Patent No. 2,500,149. For instance, some granulated copolymers can be swelled by contact with 10 to 50 volume percent of a solvent such as tetrachloroethylene to as much as about 170% of the original copolymer volume. However, in most instances even slight swelling is helpful in reducing subsequent disintegration. After draining off excess solvent, the swollen granules are then treated with one of the sulfonating agents mentioned above, e.g. chlorosulfonic acid.

The sulfonation reaction starts at the surface of each granule and is continued until the entire granule has been penetrated by the acid to give a complete reaction. The strength of the acid decreases as the sulfonation proceeds. After completion of the reaction the remaining acid is washed out with water, or first neutralized and then washed. As water replaces the acid, further swelling of the granules may occur, up to about 25%. Too rapid dilution with water tends to weaken the resin structure and may result in subsequent fracture of the granules. It is, therefore, advisable to replace the residual acid by slow addition of water over a period of as much as 24 hours or more. Either stepwise or continuous water addition is suitable.

The washed sulfonated product is saturated with water and in a swollen state. Thus, commercially available sulfonated resins normally contain from about 40 to 70% water. It is advisable to store such resins in water-tight containers under conditions which will prevent drying out of the resin as undue loss of this water content may reduce the catalytic activity as well as the physical strength of the resin, thereby leading to disintegration of the granules upon subsequent contact with water. For instance, a resin originally containing 55% moisture may be dried out at 60% relative humidity to an equilibrium moisture content of only about 30%. When such a partially dried out resin is placed in water, water absorption may be so rapid that severe disintegration of the granules takes place.

It will be understood, of course, that the described polystyrene type ion-exchange resins as well as their preparation are well known and readily available as commercial products. For instance, a particularly good catalyst for purposes of the present invention is a commercial cation-exchange resin known under the trade name Dowex 50X8 and made by the Dow Chemical Company. This is a sulfonated resinous copolymer of about 92% styrene and 8% divinylbenzene, which contains about 44 to 50% moisture and about 12 to 16% sulfur in the sulfonate form, based on anhydrous resin. This material has approximately the same acidity as benzene sulfonic acid. Useful materials of this type having a somewhat higher divinyl benzene content are also marketed under the names of Dowex 50X12 as well as Dowex 50X16. All of these materials are brown in color. Furthermore, a particularly outstanding material is Dowex 50WX8 which is cream colored and especially stable in the mechanical sense due to virtually complete absence of internal strains as shown by inspection under polarized light. This material is prepared by introducing the sulfonic acid groups into the polymer under special conditions so that oxidation of the polymer is almost completely avoided.

Other satisfactory sulfonated polystyrene ion exchange resins are sold by the Rohm and Haas Company under the "Amberlite" trade mark, particularly "Amberlite-IR-120." All of these sulfonic acid type ion-exchange resins are usually sold in the form of sodium salts which can be readily converted or regenerated to the acid type by washing with an aqueous solution of sulfuric or hydrochloric acid in a manner well known by itself. In such regeneration the hydrogen ions of the wash acid replace the sodium ions of the resin. The ion-exchange resins in their free acid form have an acidity of about 2 to 10 milliequivalents per gram, depending on resin base and extent of sulfonation. The preferred commercial polystyrene-type sulfonated resins usually have an acidity of about 5 milliequivalents/gram.

The hydrogen ion exchange resins just described are further modified by replacing about 5 to 95%, or preferably 25% to 75% of their hydrogen ions with metal ions. This can be accomplished by impregnating the resin with a proper amount of an aqueous or acidic solution of a suitable salt of the desired metal, and washing off the resulting free acid produced by the exchange of the metal ions for the hydrogen ions of the resin. For instance, solutions of salts such as cupric chloride, silver nitrate, cobalt nitrate, manganese sulfate, zinc sulfate and so forth can be used in the impregnation. The anion of the metal salt is of course chosen with a view to assuring ready solubility in water. However, if the salt in question is not readily soluble in water, free acid such as hydrochloric may be added to aid in the dissolving process. Also, sometimes it may be desirable to impregnate the ion exchange resin with salts or metal organic compounds contained in solvents of lower polarity such as alcohol, ether, or hydrocarbons.

The present invention is applicable to the hydration of a variety of olefins in the $C_2$ to $C_{12}$ range such as propylene, heptene or dodecene, but is particularly effective for hydrating normal olefins such as ethylene, propylene and n-butenes, or hydrocarbon mixtures containing these. Hydrocarbon feed rates or space velocities may be in the range of about 0.5 to 4 volumes of liquid olefin per volume of catalyst per hour. The hydration product consists largely of a mixture of the corresponding alcohols and ethers. Thus, isopropyl alcohol and diisopropyl ether are derived by hydration of propylene, etc. The ratio of alcohol to ether in the hydrated product may range from about 95:5 to 20:80, depending on the specific reaction conditions employed. In particular, relatively low olefin feed rates, low ratios of water-to-olefin, and high reaction temperature favor the formation of ether relative to alcohol.

The reaction temperature is usually kept at about 250° to 425° F., preferably at about 315° to 375° F., the optimum depending somewhat on the particular olefin treated and product desired. At higher temperatures the resins tend to be relatively unstable and have a short catalyst life. Enough pressure is preferably employed to keep the water of hydration at least partly in liquid phase. Accordingly, reaction pressures may range from about 600 to 3000 p.s.i.g., preferably 1,000 to 1,500 p.s.i.g.

The catalyst is normally disposed in the reaction zone in the form of a packed bed of granular particles ranging in size from about 20 to 60 or 100 mesh. The reaction mixture can be passed through such a bed either upwardly or downwardly.

Water of hydration is fed to the reaction zone in a ratio of about 0.3 to 3 moles per mole of olefin, depending at least in part on the product distribution desired. For instance, at feed rates not in excess of 1.5 v./v./hour, temperatures above 350° F. and water/olefin mole ratios of not more than about 1, a product quite rich in ether can be produced. Conversely, at high feed rates, lower temperatures and high water/olefin ratios, almost pure alcohol can be made. The hydration products are valuable additives for gasoline or diesel fuel which, in addition, may contain other conventional materials such as anti-oxidants, solvent oil, tricresyl phosphate, and so on.

The following specific examples will further serve to illustrate the nature, operation and advantages of the present invention.

EXAMPLE 1

A copper-modified hydration catalyst was prepared as follows from a commercial ion exchange resin known as "Dowex 50X8." This latter is a resinous copolymer of about 92% styrene and 8% divinylbenzene, sulfonated to contain, on a dry basis, about 40% sulfonic acid groups ($SO_3H$). In its commercial form it is present as a sodium salt and contains about 50% adsorbed water based on the weight of anhydrous resin. Its particle size is about 20 to 50 mesh.

The commercial resin was first "regenerated" by washing with dilute sulfuric so as to replace the sodium ions with hydrogen. Free sulfate ions were washed out with distilled water, and liquid water was sucked off on a suction filter. Thus a "regenerated" acidic hydrogen ion exchange resin was produced containing free sulfonic acid groups. About 50% of water remained adsorbed in the "dry" acidic resin based on the weight of anhydrous material.

430 parts by weight of this acidic resin (1.29 equiv. theoretical of hydrogen ion) was slurried with 67 parts by weight of $CuCl_2 \cdot 2H_2O$ (0.785 equiv. of cupric ion) in 1,000 parts by weight of distilled water. After thorough shaking, the mixture was allowed to settle and the clear liquid was decanted. The resin was washed twice with 1000-part portions of distilled water and was sucked free of liquid water on a suction filter. About 61% of the hydrogen ions originally present in the acidic resin were thus replaced by copper.

This catalyst was used for hydrating pure propylene. A bed of this catalyst was formed in a tubular carbon steel reactor and a stream of feed passed therethrough in two separate tests conducted at 350° F. and 400° F., respectively. Fresh catalyst was used in each test. Both tests were continuous and were conducted at a pressure of 1000 p.s.i.g., a feed rate of 2 volumes of liquid propylene per volume of catalyst per hour, and a ratio of 1 mole of water per mole of propylene. The yield of oxygenated product having a boiling range of 133° to 176° F. was 32.8 weight percent based on propylene in the run conducted at 350° F. and 24.0 weight percent in the run conducted at 400° F. In both cases the product consisted of a major proportion of isopropyl alcohol and a minor proportion of isopropyl ether, and no polymer was observed in either case.

Batch tests were also conducted in fresh portions of this same catalyst in a pressure bomb at 300° F. and 390° F., respectively. The yields of oxygenated product were substantially lower in the batch tests than in the continuous tests. In the 300° F. batch test it was observed that the cupric ions of the resin appeared to have been completely reduced to free copper metal at the end of the run.

EXAMPLE 2

A silver-modified hydration catalyst was prepared as follows. "Dowex 50X8" resin was regenerated with sulfuric acid as in Example 1 to replace the sodium ions with hydrogen. 1000 grams of the resulting acidic hydrogen ion resin (about 2.6 g. equiv. $H^+$) was slurried in 2 liters of distilled water and 221 grams of $AgNO_3$ (1.30 g. equiv. $Ag^+$) was added slowly with thorough mixing. After standing three days the clear solution still gave a heavy precipitate when tested with hydrochloric acid, indicating that some silver ions were not absorbed by the resin. The resin was filtered and washed thoroughly with distilled water.

EXAMPLE 3

500 grams of regenerated acidic "Dowex 50X8" resin (1.3 equiv. $H^+$) slurried in 500 ml. of distilled water and a solution of 73.3 grams of $SnCl_2.2H_2O$ in 1 liter of distilled water (0.65 equiv. $Sn^{++}$) were mixed with stirring. The mixture was allowed to stand two days with occasional stirring. The resulting tin-modified resin was filtered and washed with 5 liters of distilled water on a suction filter.

EXAMPLES 4–7

Other metal-modified resins were prepared by the same basic procedure as in Example 3. In each case 500 grams of regenerated "Dowex 50X8" resin in its acid form (1.3 equiv. $H^+$) was slurried in 500 ml. of distilled water and mixed with one liter of the various aqueous metal salt solutions listed in Table I. In each case the mixture was allowed to stand for two days with occasional stirring, whereupon it was filtered and the residue washed with 5 liters of distilled water on a suction filter.

Table I.—Metal salt solutions used to modify resin (1.3 equiv. $H^+$)

| Example | Metal Salt Solution | Equivalent Amount of Metal Ion |
|---|---|---|
| 4 | 46.7 g. $ZnSO_4.7H_2O$ | 0.325 $Zn^{++}$ |
|   | 27.7 g. $CuCl_2.2H_2O$ | 0.325 $Cu^{++}$ |
| 5 | 94.6 g. $Co(NO_3)_3.6H_2O$ | 0.65 $Co^{+++}$ |
| 6 | 55.0 g. $MnSO_4.H_2O$ | 0.65 $Mn^{++}$ |
| 7 | 44.8 g. $LiNO_3$ | 0.65 $Li^+$ |

EXAMPLES 8–10

Still other metal-modified hydration catalysts were prepared by treating 500 g. of the acidic resin (1.3 equiv. $H^+$) with the following solutions: One solution was prepared by dissolving 70.5 g. of lanthanum oxide $La_2O_3$ in 47.4 g. of concentrated hydrochloric acid and diluting the resulting solution (0.65 equiv. $La^{+++}$) with 1 liter of distilled water prior to mixing with the resin. Another solution was prepared by dissolving 108.0 g. of vanadium dioxide, $VO_2$ in 1 liter of 1.6 N HCl to make a solution containing 0.65 equiv. $VO^{++}$. Still another solution was prepared by mixing 62.5 g. $Ti_2(SO_4)_3$ with 1.5 liters of distilled water and 100 ml. of concentrated hydrochloric acid and heating. About one half of the salt was dissolved in this manner, making a solution which contained about 0.3 equiv. $Ti^{+++}$. This solution was decanted from the undissolved salt prior to contacting with the resin.

The resins produced in Examples 2–10 are also effective for hydrating propylene and other olefins under conditions such as those described in Example 1.

Water soluble organic diluents, such as acetic acid, may be used to improve mixing and contact of the reagents with the resinous hydration catalyst.

During hydration some metallic ions of the resinous catalyst may be reduced to lower positive valences or to the free metals. In cases where the reduced form of the catalyst is less active than an oxidized form, the catalyst may be regenerated by treatment with any appropriate oxidizing agent.

In addition to the uses suggested above, the novel catalyst can also be used in numerous other hydrocarbon reactions such as alkylation, polymerization, as well as in hydrocarbon synthesis, desulfurization, esterification, etherification, dehydration of alcohols and many others.

Having described the general nature and illustrative embodiments of the invention, it is to be understood that its scope is particularly pointed out in the appended claims.

This application is a division of U.S. Serial No. 469,007, filed November 15, 1954, and now Patent Number 2,861,045.

What is claimed is:

1. A process for the catalytic conversion of mono-olefins having about 2 to 12 carbon atoms per molecule which comprises contacting said hydrocarbons under hydrating conditions of temperature and pressure with an organic hydrogen ion exchange resin having a substantial proportion of its hydrogen ions replaced by metal ions, said resin being a solid sulfonated polystyrene comprising ion exchange resin.

2. A process for converting mono-olefins having 2 to 12 carbon atoms per molecule into oxygenated products selected from a group consisting of alcohols and ethers which comprises contacting a mixture of said olefinic hydrocarbon and water under hydrating conditions of temperature and pressure with an organic hydrogen ion exchange hydration catalyst having a substantial proportion of its hydrogen ions replaced by metal ions, said resin being a solid sulfonated polystyrene comprising ion exchange resin.

3. A process for converting a normal mono-olefin of 2 to 4 carbon atoms into oxygenated products selected from the group consisting of alcohols and ethers which comprises passing a feed mixture of said mono-olefin and water at least partly in liquid phase at a temperature between about 250° and 425° F. and a pressure above 600 p.s.i.g. over a catalyst which comprises a synthetic organic hydrogen ion exchange resin having about 5 to 95% of the hydrogen ions replaced by a heavy metal ion, said resin being a solid sulfonated polystyrene comprising ion exchange resin.

4. A process according to claim 3 wherein the hydrogen ion exchange resin has an acidity of about 2 to 10 milliequivalents per gram.

5. A process according to claim 3 wherein the hydrogen ion exchange resin is a solid resinous sulfonated copolymer of about 88 to 94% styrene and 12 to 6% divinylbenzene, said copolymer containing 12 to 16% sulfur in the form of sulfonate groups.

6. A process according to claim 5 wherein about 25 to 75% of the hydrogen ions of the resin are replaced by an ion of a metal of the class consisting of group I and group VIII heavy metals of the periodic table.

7. A process according to claim 5 wherein the hydration temperature is above 315° F.

8. A process according to claim 5 wherein about 25 to 75% of the hydrogen ions of the resin are replaced by copper, the reaction temperature is between 315° and 425° F., the olefin feed rate is between about 0.5 to 1.5 volumes of liquid olefin per volume of catalyst per hour, and the feed contains about 0.3 to 1.5 moles of water per mole of olefin, thereby producing a high yield of ether.

References Cited in the file of this patent

UNITED STATES PATENTS

| | | |
|---|---|---|
| 2,126,952 | Dreyfus | Aug. 16, 1938 |
| 2,135,455 | Loder | Nov. 1, 1938 |
| 2,148,288 | Bent | Feb. 21, 1939 |
| 2,477,380 | Kreps et al. | July 26, 1949 |